United States Patent Office 3,530,066
Patented Sept. 22, 1970

3,530,066
CATALYTIC HYDROTREATING PROCESS OF PETROLEUM HYDROCARBONS CONTAINING ASPHALTENES
Tsutomu Kuwata and Yutaka Oguchi, Tokyo, and Hirotsugu Nomura, Kawasaki-shi, Japan, assignors to Nippon Oil Company, Ltd., Tokyo, Japan, a corporation of Japan
No Drawing. Filed July 29, 1968, Ser. No. 748,220
Claims priority, application Japan, July 29, 1967, 42/48,483
Int. Cl. C10g 23/02
U.S. Cl. 208—309                                15 Claims

ABSTRACT OF THE DISCLOSURE

An improved process for feeding petroleum hydrocarbon feed stock containing asphaltenes wherein the feed stock is first preliminarily treated to eliminate asphaltenes and metallic components and thereafter subjected to catalytic hydrotreatment, the improvement comprising effecting such pre-treatment by contacting said asphaltene-containing hydrocarbon feed stock with a particulate solid having a plurality of pores, the size of said pores ranging between 1,000 and 50,000 A., said particulate solid containing at least one member selected from the group consisting of Fe, Co, Ni, W, Cr, Mo and V, said particulate solid being obtained by mixing refractory particles of particle size 20–500 microns with 1–15% by weight (dry basis), based on said particles, of alumina hydrogen, followed by molding the mixture and drying.

---

This invention relates to improvements in the process for catalytic hydrotreating of petroleum hydrocarbons containing asphaltenes and comprises a first step wherein the asphaltene-containing petroleum hydrocarbons are submitted to a preliminary treatment for eliminating the asphaltic and metallic components therefrom and a second step wherein the pretreated hydrocarbons are subjected to catalytic hydrotreatment. More specifically, the invention relates to a catalytic hydrotreating process which is characterized in that in the foregoing process the preliminary treatment is carried out by contacting the aforesaid asphaltene-containing hydrocarbons, preferably in a hydrogen atmosphere, with a particulate solid having a plurality of pores, the size of which range from 1,000 to 50,000 A., preferably 2,000 to 35,000 A., and moreover containing at least one member selected from the group consisting of Fe, Co, Ni, W, Cr, Mo and V, and preferably those particulate solids in which said plurality of pores are present in a pore volume of 0.05–0.9 cc. per gram of the particulate solid, the aforesaid particulate solid being obtained by mixing refractory particles of particle size 20–500 microns, preferably 20–200 microns, with 1–15% by weight, preferably 2–10% by weight (dry basis), based on said particles, of alumina hydrogel and molding the so obtained mixture followed by drying the molded particles and preferably also calcination thereof.

As hereinafter fully described, the term "alumina hydrogel," as used herein, is a term which includes silica-alumina hydrogel. Further, what is meant by the terminology, "the pores, the size of which range from 1,000 to 50,000 A.," as indicated above, is that the radii of the pores are within the foregoing range when the distribution of the pores is at its maximum. On the other hand, the terminology, "refractory particles of particle size 20–500 microns" means that particles having the foregoing particle diameter account for at least 50% by weight of the total particles and furthermore that the average particle diameter of said particles falls within the foregoing range.

As regards the catalytic hydrotreating of petroleum and the like, numerous methods have been developed and put to commercial practice; namely, such as the various hydrorefining process including the hydrotreating and desulfurization of the unsaturated compounds such as cracked gasoline, the hydroreforming processes as typified by the octane value improvement of gasoline, or the hydrocracking processes which have as their object the production of light oils from the heavy oils. However, most of the conventional processes were principally aimed at the treatment of distilled oils. In the catalytic hydrotreatment of the asphaltene-containing petroleum hydrocarbons such as crude oil, residual oil, and residual oil-containing oils, which consists of a mixture of residual oil with other fractions such as the light oil fractions or kerosene fraction, the decline in the activity of a catalyst was pronounced as a result of the poisoning of the catalyst by the asphaltenes and metals present in the feed stock oil and, hence, there was a marked shortcoming in that operation over a prolonged period was difficult. That is to say, the residual oil, and particularly the asphaltene component present therein, tends to separate out carbonaceous material which deposits on the catalyst surface to cover the activity sites of the catalyst and become the cause of a decline in the activity of the catalyst. Again, it is known that the metals (principally vanadium and nickel) present in residual oil, and particularly in asphaltenes, also separate out onto the surface of the catalyst to become an important cause of the decline in catalytic activity. Since the carbonaceous material is readily removed by burning, the catalyst whose activity has declined as a result of the deposition of carbonaceous material can be regenerated and repeatedly used. However, where the rate of deposition is very fast, regeneration must be carried out with interruption of the operation at short intervals. Hence, this is undesirable. On the other hand, it is difficult to regenerate the catalyst upon which metals have deposited, with the consequence that it is necessary to exchange the catalyst for a new one upon deposition of the metal in a certain amount. Hence, if a catalyst whose rate of deposition is fast is used, since not only the operational cycle becomes short but also the expenditure for the catalyst becomes great, it becomes economically a disadvantage.

Further, usually a high hydrogen pressure is required for inhibiting the deposition of the carbonaceous material, and this becomes a disadvantage from the standpoint of the costs of constructing the apparatus and its operation.

The present invention concerns the improvement in the process which contemplates to overcome the foregoing shortcomings by the aforesaid first and second steps.

As a catalysts capable of being utilized in the foregoing first step, the use of active carbon, aluminum hydroxide, aluminum oxide, synthetic silica, natural or synthetic aluminum silicate, activated brown-coal or semi-coke impregnated with ferrous sulfate and sodium hydroxide, and active carbon powder activated with iron oxide have either been proposed or their use has been anticipated.

However, they all demonstrated more or less all or some of such drawbacks as lack of sufficient capacity to eliminate the asphaltic and/or metallic components, poor reproducibility of the treatment effects, or shortness of life. Thus, the purpose for which the preliminary treatment is given could not be fully satisfied.

As a result of our researches with a view to providing a process which does not possess these shortcomings, we found that these shortcomings were overcome and a markedly improved catalytic hydrotreatment of asphaltene-containing petroleum hydrocarbons could be achieved by carrying out the preliminary treatment using as catalyst of particulate solid obtained by mixing refractory particles of specified particle size with a minimum amount within a specified quantitative range of alumina hydrogel and molding the mixture followed by drying the molded particles; the so obtained particulate solid having a plurality of pores, the size of which range from 1,000 to 50,000 A. and moreover containing at least one member selected from the group consisting of Fe, Co, Ni, W, Cr, Mo and V, and preferably those particulate solids in which the pore volume is 0.05–0.9 cc. per gram.

It is therefore an object of the present invention, to improve on these shortcomings and to provide an improved process for hydrotreating the petroleum hydrocarbons including the distillation residual oil, wherein in the first stage preliminary treatment zone the asphaltenes and metals are eliminated and thereafter in the second stage reaction zone the catalytic hydrotreatment is carried out.

Other objects and advantages of the invention will become apparent from the following description.

According to the invention process, the first step such as hereinbefore described is carried out using the previously described special particulate solid. While the reason why a catalyst of this sort is effective in carrying out the preliminary treatment with a markedly improved advantage is not fully known as yet, it seems that the following facts have a bearing: (1) that in the case where the aforesaid refractory particles having a particle size falling within a specified particle diameter range is mixed with the aforesaid alumina hydrogel in an amount within a specified range, then molded into particles and thereafter dried, and preferably calcined, a plurality of secondary pores of very large pore size are found as compared with the case the previously indicated natural or synthetic substances which have already been proposed or the utilization of which has been anticipated, when used as-obtained or after granulation; and (2) that it becomes a particulate solid having great difference in its structural form in that there are probably present minute pores in the refractory particles and/or that part of the alumina gel, after drying, which is believed also to demonstrate a binder-like function, that is to say, it probably has a "mallet and rice cake" like structure. As shown in the hereinafter given comparisons, a marked improvement cannot be achieved by use of the refractory particles or alumina hydrogel, as used in the present invention, when the foregoing substances are used independently.

The most important feature of the present invention resides in the use of the hereinbefore indicated particulate solid in the preliminary treatment step. This particulate solid obtained, as hereinbefore described, by mixing refractory particles having a particle size of 10–500 microns with 15% by weight (dry basis) of said particles of alumina hydrogel, molding the mixture into particles and thereafter drying, and having a plurality of pores whose pore size range from 1,000–50,000 A. and moreover containing at least one member selected from the group consisting of Fe, Co, Ni, W, Cr, Mo and V will be more fully described below.

Materials which can be used as the aforesaid refractory particles in the present invention include the synthetic and natural substances such, for example, as alumina, alumina hydrate, silica-alumina and silica-alumina hydrate, in which the alumina component or the silica-alumina component has been dried or dried and calcined, bauxite, laterite, magnetite, diatomaceous earth, the various classes of clay, Chinese yellow (ochre) and bentonite, or the mixtures of these.

Of these refractory particles, those whose partial diameter range between 10 and 500 microns, preferably 20–200 microns, and especially preferably 20–100 microns, are chosen and used.

The particle size of the refractory particles has a great influence on the effectiveness with which the objects of the present invention are achieved, it being necessary to adjust the particle size in accordance with the class of crude of the feed stock oil to be treated and its boiling range. However, since the compressive strength of the molded product declines as the size of the particles becomes greater, the particle size cannot be made excessively large. For achieving the objects of the present invention most effectively, the particle sizes indicated above are desired as a condition inseparably bound to the amount of alumina hydrogel to be mixed therewith and other requisites.

When the alumina type substances are used as the refractory particle material, the alumina hydrates and silica-alumina hydrates prepared by any method can be used. Hence, the term "alumina hydrogel," as used in the appended claims, is to be understood to comprehend the silica-alumina hydrogel.

For example, the alumina hydrates or silica-alumina hydrates obtained by the hydrolysis of an aqueous solution containing an aluminum compound may be used as the starting material. The alumina hydrogel or silica-alumina hydrogel obtained by heating an aqueous solution containing basic aluminum sulfate is especially desirable as a starting material.

The method of preparing the alumina type refractory particles can be carried out in customary manner. For example, alumina, alumina hydrate, silica-alumina or silica-alumina hydrate is formed in an aqueous solution, then dried or dried and calcined followed by comminution and, if necessary, screening to obtain particles of desired size. The comminution step can be omitted, however, in those cases where the particle size of the dried hydrate is within the desired range.

When the natural substances such as hereinbefore indicated are used as the refractory particles, they are used by comminution in their as-obtained state or preferably after drying or drying and calcination. Further, these natural substances can be mixed and kneaded with an alumina type hydrogel, then dried or dried and calcined followed by comminution, and the so obtained mixed particles can also be used as the refractory particles.

The particulate solid which is used as catalyst in the preliminary treatment in the invention process is obtained by mixing together an alumina hydrogel (a term meant to include the silica-alumina hydrogel) with refractory particles such as hereinabove described and then molding this mixture into particles. The mixing is preferably carried out by a kneading technique.

As mentioned in connection with the preparation of the refractory particles, the alumina hydrogel to be used in this case include all classes of alumina hydrogels or silica-alumina hydrogels, but preferably used is the alumina hydrogel or silica-alumina hydrogel which has been obtained by heating and gelling an aqueous solution containing a colloid of basic aluminum sulfate, following which the gel formed is washed with water and given an alkali treatment. This hydrogel made by using basic aluminum sulfate has a greater caking property than that of the hydrogels made by the other methods, and hence the compressive strength of the molded products can be increased. That which has been prepared by using as the starting material an aqueous colloidal solution of basic aluminum sulfate in which the mole ratio $SO_3:Al_2O_3$ is 0.8–1.6:1 or a mixed solution of such an aqueous colloidal solution with a silica sol can especially be recommended.

A stock solution such as described above has a characteristic of gelling when heated. Thus, by passing the foregoing stock solution in drop fashion through a water-immiscible solvent maintained at a temperature of 40–100° C., it can be made into a hydrogel. If this hydrogel is left standing in its unstable state, it reverts to a sol. Hence, it is stabilized by reducing its $SO_3:Al_2O_3$ mole ratio to 0.4–0.7:1 by hydrolysis by transferring it into cold or hot water. Next, it is brought into contact with an aqueous alkaline solution to remove the residual sulfate radical, after which it is water-washed to obtain the alumina hydrogel or silica-alumina hydrogel.

A hydrogel such as hereinabove described can be used as the previously indicated refractory particles. In this case, the foregoing hydrogel is conveniently used after having been dried or dried and calcined and thereafter comminuted to the particle size desired.

According to this invention, the alumina hydrogel such as hereinabove described is mixed in a quantity ranging 1–15%, and preferably 2–10% by weight (dry basis) with refractory particles of a specified particle size range, as previously indicated.

An optimum quantity of the alumina hydrogel is determined within the foregoing quantitative range depending upon the properties of the feed stock oil to be treated and the particle size of the refractory particles.

The ratio in which the refractory particles and the alumina type hydrogel is mixed is presumed to have a bearing on the formation of the previously indicated "millet and rice cake" like structural form, but it also has an effect on the effectiveness of the removal of the asphaltenes and metals, as intended by the invention, as well as on the compressive strength of resulting particulate solid. Hence, the alumina hydrogel should be utilized within the foregoing quantitative range under conjoint conditions with the other requisites of the present invention.

After the refractory particles and alumina hydrogel have been mixed, the mixture can be molded using any of the known techniques including, for example, the extrusion or compression molding techniques. Extrusion molding can be recommended as being the most convenient.

After molding and drying of the particulate solid, it can, if necessary, be calcined at a temperature above about 300° C. In general, the particulate solid which has been submitted to the calcination step is to be preferred.

The present invention uses the particulate solid which has been prepared specially in the manner hereinbefore described and having a plurality of pores the size of which range between 1,000 and 50,000 A., preferably 2,000–35,000 A., and especially preferably 5,000–30,000 A.

This pore size is from several to 500 times that of the pores which can be inherently possessed by such as the previously indicated active carbon, aluminum hydroxide, aluminum oxide, synthetic silicate, activated brown-coal of semi-coke impregnated with ferrous sulfate and sodium hydroxide, and active carbon powder activated by iron oxide.

Further, according to the present invention, the use of this particulate solid having a plurality of pores in which the pore volume is 0.05–0.9 cc., and preferably 0.1–0.6 cc. per one gram of said particulate solid is especially to be recommended.

Further, the particulate solid to be used in the present invention must contain one or more metals selected from Fe, Co, Ni, W, Cr, Mo and V. In those cases where the aforesaid refractory particles already contains the foregoing metals as a constituent component thereof, such as in the case of laterite, bauxite or magnetite, they may be used without the addition of these metals, but the further addition of these metals is to be preferred.

On the other hand, when the refractory particles are natural substances which do not contain the foregoing metals, they are used after adding these metals.

The metal can be incorporated in the refractory particles in various ways. In general, the methods of incorporating the metal can be roughly classified into the two methods of dipping and kneading. In the present invention the metal can be added during any of the steps of preparing the molded product. For example, the metal can be incorporated in the refractory particles during the step of making the refractory particles, employing either the dipping or kneading technique. Alternatively, the metal can be incorporated in the refractory particles by adding an aqueous solution of a compound of the metal during the step of kneading the refractory particles with the alumina type hydrogel. In addition, the metal can be incorporated in advance in the alumina type hydrogel in customary manner before kneading it together with the refractory particles. Again, the refractory particles and the alumina type hydrogel can be kneaded together and molded, and the so obtained molded product can be incorporated with the metal by means of the dipping technique. Further, it is also possible to make conjoint use of two or more of these methods for incorporating the metal in the refractory particles.

While the effects of removing the asphaltenes and metals contained in the feed stock oil becomes greater as the amount incorporated of the foregoing metals is increased, in those cases where the metal is added further to those already containing the metal it becomes an economic disadvantage if a large amount is used. Hence, in deciding upon the optimum amount to be added, this point should be taken into consideration. This amount also differs depending upon the classes of the refractory particles, alumina type hydrogel, metal and feed stock oil. Normally, a smaller amount of addition will be sufficient than in the case of the hydrotreating catalyst containing the foregoing metals which is used in the second step. For example, an amount on the order of 3–10% by weight based on the particulate solid is used, but this amount is not critical.

According to the invention process as hereinbefore described, after submitting the asphaltene-containing petroleum hydrocarbons to a preliminary treatment by contacting them with the particulate solid, the so treated product may then be submitted to the second step, the catalytic hydrotreating step which per se is known.

While the reason why the particulate solid used in the preliminary treatment removes from the asphaltene-containing petroleum hydrocarbons the asphaltenes and undesirable metals contained therein in an improved manner is not known, it is presumed that the fact that it possesses a unique structural form, as hereinbefore described, and that it has numerous pores of the pore size as previously indicated as well as that it contains the metals of Fe, Co, Ni, W, Cr, Mo or V is related to its possession of an excellent and improved capacity for elimination of the asphaltenes and undesirable metals.

Hence, the activity of the hydrotreating catalyst is maintained over a long period of time even though the hydrogen pressure in the reaction zone of the second step is held at a relatively low level, and thus the catalytic hydrotreatment can be carried out commercially with tremendous advantage.

The particulate solid used in the preliminary treatment is conveniently used in a size on the order of 0.5–10 mm., and preferably 0.5–5 mm.

The preliminary treatment may be carried out by either the batch-wise or continuous method. Further, in the case where the continuous method is adopted, the various known techniques such as the fixed, moving and fluidized bed methods can be used. The setup is conveniently one in which the exchange of the molded particulate solid contaminated by the asphaltenes and metals can be readily carried out during the operation. For example, a convenient arrangement consists of the provision of two or more preliminary treatment apparatuses and switching over to the other when the preliminary treatment capacity of one has declined, regenerating or exchanging the degraded particulate solids, or of employing a moving or fluidized bed for the preliminary treatment apparatus and continuously exchanging the degraded particulate solids.

The treatment in the preliminary treatment zone is preferably carried out under the conditions normally of temperature 200–500° C., pressure below 300 kg./cm.$^2$ (gauge) and liquid hourly space velocity of 0.2–10 vol./ vol./hr. An optimum combination of these conditions should be chosen in accordance with the properties of the feed stock oil. Although hydrogen is not necessarily required in carrying out the preliminary treatment, the use of hydrogen in a small quantity is much to be preferred for preventing the oxidative degradation of the feed stock oil and for effectively achieving the object of the present invention. When hydrogen is here used and when the metal contained in the particulate solid possesses hydrotreating activity, a certain degree of hydrotreating effect can also be achieved along with the effects noted above. In a case such as this, a considerable amount of hydrogen is desirably used.

The treated oil which has left the preliminary treatment zone is delivered to the reaction zone after separating the hydrogen gas therefrom or without so doing and is submitted to the customary hydrotreatment in said latter zone.

The catalytic hydrotreating reaction, the second step, comprehends such known reactions as, for example, the hydrorefining reaction which has as its object the removal of the various impurities such as the sulfur, nitrogen and oxygen compounds and the hydrocracking reaction which has as its object the production of light oils as well as the various other known reactions. Various catalysts are used in the second step reaction zone in accordance with the intended hydrotreating reaction. For example, in the hydrorefining reactions such as the desulfurization, denitrogenation and deoxidation reactions, a catalyst consisting of one or more metals selected from the metals of Groups VI and/or VIII of the Periodic Table supported on a silica-alumina carrier is usually used, the catalysts containing such as molybdenum, cobalt or nickel being most frequently used. On the other hand, in the case of hydrocracking a catalyst consisting of molybdenum, tungsten, nickel or cobalt supported on an acidic carrier is usually used.

The mode of reaction in the reaction zone may be either batchwise or continuous. And in the case of the continuous method, the various known techniques such as the fixed, moving or fluidized bed techniques can be employed. As regards the reaction conditions and after treatments, the most suitable conditions and methods for the various reactions are combined and used.

These reactions of the second step are processes which per se are known. Hence, to avoid prolixity their detailed description will not be given, this being in the technical scope of those skilled in the art and changes and modifications can be made as desired.

The present invention will now be further illustrated by means of the following examples which illustrate several modes of practicing the present invention, it being understood that the present invention is not limited thereby and variations and modification are possible provided that they do not depart from the spirit of the invention and scope of the appended claims.

EXAMPLE 1

While vigorously stirring a saturated aqueous aluminum sulfate solution at room temperature, finely divided calcium carbonate was added thereto, and as a supernatant liquid was obtained an aqueous colloidal solution of basic aluminum sulfate containing 107.3 grams per liter of $Al_2O_3$ and 102.5 grams per liter of $SO_3$ (mole ratio of $SO_3:Al_2O_3=1.15:1$).

After removing the dissolved gas from this sol by deaeration of it for 5 hours under reduced pressure, water was added thereto at the rate of 200 cc. per liter of the sol, following which it was converted into spheroidal hydrogels 10-20 mm. in diameter by being added dropwise from the top of a tank into light oil maintained at a temperature of 85° C. contained therein to a height of 10 meters. The hydrogels were then transferred to a tank filled with water and were water-washed by flowing fresh hot water for 24 hours, thus removing a part of the sulfate radical contained in the hydrogel by hydrolysis. After completion of the water-washing, the mole ratio $SO_3:Al_2O_3$ inside the hydrogel was 0.51:1.

Next, the tank containing the alumina hydrogel was filled with ammonia water of 3% concentration and heated at a temperature of 55° C., after which the liquid was withdrawn. This was repeated five times, thus raising the pH of the liquid to as high as 8.5 to convert the remaining sulfate radicals to ammonium sulfate. This was followed by water-washing until no further sulfate was discernible to obtain the spheroidal hydrogel.

Next, 280 cc. of water were added to 132.3 grams of ammonium molybdate, after which 525 cc. of 28%, ammonia water were added with stirring and the mixture was completely dissolved. Separately, an aqueous solution of 105.1 grams of cobalt nitrate in 208.5 cc. of water was prepared, and this cobalt nitrate solution was gradually added dropwise to the ammonium molybdate solution to prepare a mixed solution.

4,455 grams of the hereinbefore described hydrogel and 311.3 grams of the foregoing mixed solution were mixed and kneaded together, after which the kneaded mass was dried for 24 hours at 110° C., and thereafter calcined for 3 hours at 500° C. The resulting calcined product was comminuted and those particles 20-100 microns in size were separated out by screening to obtain the refractory particles. 185.6 grams of the previously described alumina hydrogel and 6.5 cc. of the aforesaid mixed solution of active metal compounds were added to these refractory particles and the mixture was kneaded. This kneaded mass was extrusion molded, then dried for 6 hours at 105° C., and thereafter calcined for 3 hours at 500° C. The resulting particulate solids had a diameter of 1.5 mm. and the content of the active metal therein was 5.26% by weight molybdenum and 1.52% by weight cobalt.

By way of comparison, an alumina hydrogel obtained from aluminum chloride in customary manner and a mixed solution of active metals of identical composition as hereinabove described were mixed and kneaded together, followed by molding to obtain a molded product 1.5 mm. in diameter and containing 5.28% by weight of molybdenum and 1.49% by weight of cobalt (comparison particulate solid "A").

Also, by way of comparison, comparison particulate solid "B" was prepared in exactly the same manner as in Example 1 except that refractory particles passing a 600-mesh sieve (particle diameter less than 20 microns) were used.

Further, by way of comparison, an attempt was made to prepare a comparison particulate solid as in Example 1 but using refractory particles passing a 32-mesh sieve (particle diameter over 500 microns) however, a molded product could not be made in this case.

The physical properties of the foregoing three particulate solids are shown in Table I.

TABLE I

| Particulate solid | Packing density, g./cc. | Compressive strength, average value kg. | Pore [1] volume, cc./g. | Pore size, A. |
| --- | --- | --- | --- | --- |
| Particulate solid used in present invention | 0.70 | 19 | 0.273 | 10,000 |
| Comparison particulate solid "A" | 0.83 | 20 | 0.087 | 100 |
| Comparison particulate solid "B" | 0.79 | 20 | 0.098 | 500 |

[1] Pores of radius above 75 A.

It can be seen from the properties of the particulate solids given in Table I that in the case of the particulate solid used in the present invention its volume of pores of radii above 75 A. is 0.273 cc. per gram and the radii of the pores demonstrating a maximum value of the pore distribution, i.e., pore size, is in the neighborhood of 10,000 A., and thus that it possesses pores of large size in an extremely greater degree than in the case of the comparison particulate solids.

Fixed beds packed with the aforesaid three classes of particulate solids were used in the preliminary treatment and a cobalt-molybdenum-alumina catalyst was used in the reaction zone in carrying out the hydrorefining of a residual oil obtained by the distillation at normal atmospheric pressure of Khafji crude oil. The treatment in the preliminary treatment zone was carried out using hydrogen and the reaction conditions of temperature 350° C., pressure 80 kg./cm.$^2$ g., liquid hourly space velocity 2 vol./vol./hr. and flow ratio of the hydrogen to feed stock oil of 500 l.-NTP/l. The treated oil leaving the preliminary treatment zone was conveyed continuously to the reaction zone where it was subjected to the hydrorefining treatment. The reaction conditions used in the reaction zone were temperature 400° C., pressure 80 kg./cm.$^2$ g., liquid hourly space velocity of the pretreated oil 1 vol./vol./hr. and hydrogen-to-pretreated oil flow ratio of 900 l.-NTP/l. The refined oil leaving the reaction zone was submitted to steam stripping under reduced pressure to distill off and eliminate the hydrogen sulfide, other gases and decomposed light oils to obtain the product.

The properties of the pretreated oil on the 50th hour after the operation was started are shown in Table II.

to which concentrated solution is gradually added calcium carbonate powder, thereby obtaining as a supernatant liquid an aqueous colloidal solution of basic aluminum sulfate containing 105.2 grams per liter of $Al_2O_3$ and 77.6 grams per liter of $SO_3$ (the $SO_3$ believed to be bound to the iron and magnesium is eliminated and the mole ratio $SO_3:Al_2O_3=0.94:1$). One liter of this solution and 100 cc. of a silica sol containing 82.6 grams per liter of $SiO_2$ were mixed homogeneously, and the so obtained mixed solution was converted to spheroidal hydrogels 10–20 mm. in diameter by adding it dropwise into a tank containing light oil maintained at a temperature of 90° C. The resulting hydrogel was transferred to a tank filled with water where a part of the sulfate radicals in the hydrogel was removed by washing with seven changes of water. After completion of the water-washing, the mole ratio $SO_3:Al_2O_3$ was 0.56:1. Next, the tank was filled with ammonia water of 4% concentration which was heated at 54° C., thus converting the remaining sulfate radicals to ammonium sulfate followed by water-washing until no further sulfate radicals could be detected. The so obtained spheroidal silica-alumina hydrogel was dried for 24 hours at 110° C., then calcined for 3 hours at 550° C., followed by comminution and separating out those of particle size 20–150 microns by screening to thus obtain the refractory particles.

471.3 grams of the previously described silica-alumina hydrogel and a small amount of water were added to 645.7 grams of the foregoing refractory particles and the mixture was kneaded together, after which the kneaded mass was extrusion molded and the molded product was dried for 5 hours at 110° C. followed by calcining

TABLE II

| Oil | Total sulfur, wt. percent | Total nitrogen, wt. percent | Asphaltenes,[1] wt. percent | Metals, p.p.m. Vanadium | Nickel |
|---|---|---|---|---|---|
| Feed stock oil | 4.30 | 0.38 | 7.86 | 81 | 28 |
| Pretreated oil of Example 1 | 2.37 | 0.25 | 1.52 | 10 | 6 |
| Pretreated oil of Comparison 1 (particulate solid "A") | 2.40 | 0.26 | 6.35 | 53 | 21 |
| Pretreated oil of Comparison 2 (particulate solid "B") | 2.38 | 0.25 | 6.13 | 52 | 20 |

[1] Petroleum ether insoluble portion.

As is apparent from Table II, a marked decrease took place in the asphaltenes, vanadium and nickel contained in the feed stock oil when pretreatment was carried out using the particulate solid prepared in accordance with the present invention.

Next, the changes in the total sulfur and total nitrogen up to 200 hours after the start of the reaction are shown in Table III. By way of comparison, the results obtained when the hydrodesulfurization was carried out using the same feed stock oil, the same reaction conditions and the same catalyst as used in the hereinbefore described reaction zone but without the pretreatment are shown as Comparison 3.

for 3 hours at 500° C. to yield the alumina type carrier having a diameter of 1.5 mm.

Next, an aqueous solution of 131.5 grams of sodium tungstate in 789.2 cc. of water was prepared and, separately, an aqueous solution of 103.2 grams of nickel nitrate in 206.3 cc. of water was prepared.

To 281.3 grams of the previously prepared alumina type carrier were added 750 cc. of the aforesaid aqueous sodium tungstate solution. After the carrier was immersed for 3 hours in the foregoing solution, it was dried for 5 hours at 120° C. and thereafter calcined for 3 hours at 500° C.

The resulting calcined product was then dipped for 3

TABLE III

| Experiment | Total sulfur, wt. percent | | | | | Total nitrogen, wt. percent | | | | |
|---|---|---|---|---|---|---|---|---|---|---|
| | After 5 hours | After 50 hours | After 100 hours | After 150 hours | After 200 hours | After 5 hours | After 50 hours | After 100 hours | After 150 hours | After 200 hours |
| Example 1 | 0.93 | 0.97 | 0.98 | 1.00 | 1.02 | 0.18 | 0.19 | 0.19 | 0.19 | 0.20 |
| Comparison 1 (particulated solid "A") | 1.05 | 1.26 | 1.45 | 1.67 | 1.83 | 0.20 | 0.23 | 0.25 | 0.27 | 0.28 |
| Comparison 2 (particulate solid "B") | 1.03 | 1.23 | 1.42 | 1.60 | 1.76 | 0.20 | 0.22 | 0.25 | 0.27 | 0.27 |
| Comparison 3 | 1.13 | 1.35 | 1.58 | 1.79 | 2.07 | 0.21 | 0.26 | 0.29 | 0.30 | 0.32 |

As is apparent from Table III, the decline in activity of the hydrorefining catalyst was exceedingly small when the pretreating was carried out according to the present invention, even though the pressure in the reaction zone was relatively low.

EXAMPLE 2

An aqueous aluminum sulfate solution containing iron and magnesium as impurities is concentrated by heating, hours in 200 cc. of the aforesaid aqueous nickel nitrate solution, dried for 5 hours at 120° C. and thereafter calcined for 3 hours at 500° C. The diameter of the resulting particulate solid was 1.5 mm. and its content of active metals was 5.13% by weight of tungsten and 1.49% by weight of nickel, while its silica content was 7.15% by weight. The physical properties of this particulate solid are shown in Table IV.

TABLE IV

| | |
|---|---:|
| Packing density (g./cc.) | 0.65 |
| Compressive strength (average value; kg.) | 16 |
| Pore value [1] (cc./g.) | 0.316 |
| Pore size (A.) | 10,000 |

[1] Pores whose radius is above 75 A.

It is apparent from the properties given in Table IV that in the case of the catalyst obtained according to the process described above the pore volume of those pores having a radius above 75 A. is 0.316 cc. per gram and the pore size is in the neighborhood of 10,000 A. Hence, it can be seen that this catalyst has a extremely great number of pores of large size.

The hydrorefining of a residual oil obtained by the distillation at normal atmospheric pressure of Khafji crude was carried out using in the preliminary treatment a fixed bed packed with the foregoing particulate solid and in the reaction zone a nickel-cobalt-molybdenum-alumina catalyst. By way of comparison, the instance where the pretreatment was carried out under identical conditions using a carrier prepared as in this example but without impregnation with the metal is given as Comparison 4. In carrying out these experiments the pretreatment conditions and the conditions in the reaction zone were identical to those of Example 1.

The properties of the pretreated oil on the 50th hour after the start of operations are shown in Table V.

TABLE V

| Oil | Total sulfur, wt. percent | Total nitrogen, wt. percent | Asphaltenes,[1] wt. percent | Metals, p.p.m. Vanadium | Metals, p.p.m. Nickel |
|---|---|---|---|---|---|
| Feed stock oil | 4.30 | 0.38 | 0.86 | 81 | 28 |
| Pretreated oil of Example 2 | 2.55 | 0.28 | 1.63 | 13 | 8 |
| Pretreated oil of Comparison 4 | 2.43 | 0.27 | 3.46 | 31 | 5 |

[1] Petroleum ether insoluble portion.

As is apparent from Table V, the amount of asphaltenes, vanadium and nickel contained in the feed stock oil is greatly reduced when the pretreatment was carried out using the particulate solid prepared according to the present invention.

Next, in Table VI are shown the changes in total sulfur and total nitrogen up to 200 hours after the start of the reaction. By way of comparison, the hydrodesulfurization was carried out using the same feed stock oil, the same reaction conditions and the same catalyst as used in the hereinbefore described reaction zone but without the pretreatment. The results are shown as Comparison 5. Further, the instance in which the pretreatment was carried out using the comparison particulate solids is shown as Comparison 4.

TABLE VI

| | Total sulfur, wt. percent | | | | | Total nitrogen, wt. percent | | | | |
|---|---|---|---|---|---|---|---|---|---|---|
| Experiment | After 5 hours | After 50 hours | After 100 hours | After 150 hours | After 200 hours | After 5 hours | After 50 hours | After 100 hours | After 150 hours | After 200 hours |
| Example 2 | 0.85 | 0.89 | 0.91 | 0.92 | 0.92 | 0.15 | 0.17 | 0.17 | 0.18 | 0.19 |
| Comparison 4 | 0.87 | 0.95 | 1.03 | 1.17 | 1.25 | 0.16 | 0.19 | 0.19 | 0.21 | 0.23 |
| Comparison 5 | 0.92 | 1.15 | 1.30 | 1.43 | 1.72 | 0.18 | 0.23 | 0.25 | 0.26 | 0.29 |

As can be seen from Table VI, the decline in the activity of the hydrorefining catalyst was extremely small when the pretreatment was carried out according to the present invention, even though the pressure of the reaction zone was relatively low.

EXAMPLE 3

To 275.2 grams of ammonium molybdate were added 290 cc. of water followed by the addition of 516 cc. of ammonia water of 28% concentration with stirring to effect the complete dissolution of the mixture. Separately, a solution was prepared by dissolving 135.7 grams of cobalt nitrate and 18.3 grams of ammonium metavanadate in 3,730 cc. of water. The latter solution containing the cobalt nitrate and ammonium metavanadate was then added gradually to the former ammonium molybdate solution with stirring, thereby preparing a mixed solution.

4,356 grams of alumina hydrogel prepared as in Example 1 and 613.4 cc. of the foregoing mixed solution were mixed and kneaded together, after which the kneaded mass was dried for 24 hours at 110° C. and thereafter comminuted. Those of particle size 100–400 microns were separated out by screening, thus obtaining the refractory particles.

Next, to an aqueous aluminum chloride solution was gradually added 20% ammonia water until a pH of 8 was reached. The precipitate was separated by filtration and washed to obtain the alumina hydrogel.

191.3 grams of the foregoing alumina hydrogel and 13.1 cc. of the aforesaid mixed solution of active metal compounds were added to the aforesaid refractory particles and the mixture was kneaded together. After drying this kneaded mass for 5 hours at 110° C., it was calcined for 3 hours at 500° C. The properties of the calcined product are shown in Table VII. By way of comparison, that prepared under identical conditions except that the alumina hydrogel in an amount of 1,680 grams was added to the refractory particles is shown as Comparison 6. Further, the preparation of a product using the alumina hydrogel in an amount of 36 grams was also attempted, but in this case it could not be molded.

TABLE VII

| Experiment | Packing density, g./cc. | Compressive strength, average value, kg. | Pore volume,[1] cc./g. | Pore size A. |
|---|---|---|---|---|
| Example 3 | 0.65 | 8 | 0.285 | 35,000 |
| Comparison 6 | 0.78 | 20 | 0.135 | 500 |

[1] Pores of a radius above 75 A.

It is seen from the properties given in Table VII that the particulate solid obtained by the invention process has a pore volume of those pores having a radius above 75 A. of 0.285 cc. per gram and further that the pore size is in the neighborhood of 35,000 A. Hence, it can be seen that the invention particulate solid has an extremely greater number of the larger pores as compared with the comparison particulate solid which was obtained by using a large amount of the hydrogel.

The hydrorefining of a residual oil obtained from the distillation at normal atmospheric pressure of Khafji crude was carried out using in the preliminary treatment a fixed bed packed with the foregoing invention particulate solids and that packed with the comparison particulate solids and in the catalyst zone a cobalt-molybdenum-alumina catalyst. The preliminary treatment conditions and the reaction conditions in the reaction zone were identical to those employed in Example 1.

The properties of the pretreated oil on the 50th hour after the start of the operations are shown in Table VIII.

TABLE VIII

| Oil | Total sulfur, wt. percent | Total nitrogen, wt. percent | Asphaltenes,[1] wt. percent | Metals, p.p.m. Vanadium | Nickel |
|---|---|---|---|---|---|
| Feed stock oil | 4.30 | 0.38 | 0.86 | 81 | 28 |
| Pretreated oil of Example 3 | 2.39 | 0.27 | 1.50 | 9 | 7 |
| Pretreated oil of Comparison 6 | 2.45 | 0.28 | 5.75 | 48 | 20 |

[1] Petroleum ether insoluble portion.

As is apparent from Table VIII, the amount of the asphaltenes, vanadium and nickel in the feed stock oil is greatly reduced when the pretreatment is carried out using the particulate solids prepared in accordance with the present invention.

Next, the changes in the total sulfur and total nitrogen up to 200 hours after the start of the reaction are shown in Table IX.

TABLE IX

| | Total sulfur, wt. percent | | | | | Total nitrogen, wt. percent | | | | |
|---|---|---|---|---|---|---|---|---|---|---|
| Experiment | After 5 hours | After 50 hours | After 100 hours | After 150 hours | After 200 hours | After 5 hours | After 50 hours | After 100 hours | After 150 hours | After 200 hours |
| Example 3 | 0.84 | 0.88 | 0.87 | 0.88 | 0.90 | 0.16 | 0.17 | 0.17 | 0.19 | 0.20 |
| Comparison 6 | 1.03 | 1.19 | 1.40 | 1.58 | 1.72 | 0.19 | 0.23 | 0.24 | 0.25 | 0.25 |

As can be seen from Table IX, the decline in the activity of the hydrorefining catalyst was very small when the pretreatment was carried out according to the present invention, even though the pressure of the reaction zone was relatively low.

EXAMPLES 4–6

251 grams of laterite (Fe, 47.3 wt. percent; $Fe^{2+}$, 0.9 wt. percent; Ni, 0.8 wt. percent; Cr, 1.7 wt. percent), 243 grams of bauxite ($Fe_2O_3$, 11.5 wt. percent) and 245 grams of magnetite were severally kneaded together with a small quantity of water and 141.2 grams of the alumina hydrogel of Example 1, and the several kneaded masses were extrusion molded followed by drying the several molded products for 6 hours at 120° C. and thereafter calcining them for 3 hours at 600° C. to obtain the several particulate solids having a diameter of 1.5 mm. The properties of these particulate solids were substantially the same as those of the particulate solid obtained in Example 1.

The hydrorefining of a residual oil obtained by distillation at normal atmospheric pressure Khafji crude was carried out using in the pretreatment step fixed beds packed with the foregoing particulate solids and in the reaction zone a cobalt-molybdenum-alumina catalyst. Treatment was carried out in the pretreatment zone using hydrogen, and the treatment conditions of temperature 300° C., pressure 70 kg.cm.² g., liquid hourly space velocity of the feed stock oil 2 vol./vol./hr. and flow ratio of hydrogen to feed stock oil 400 l.-NTP/l. The treated oil leaving the pretreatment zone was continuously conveyed to the reaction zone and was submitted to the hydrorefining reaction. The reaction conditions employed in the reaction zone were temperature 380° C., pressure 90 kg./cm.² g., liquid hourly space velocity of the pretreated oil 1 vol./vol./hr. and flow ratio of hydrogen to pretreated oil 700 l-NTP/l. The refined oil leaving the reaction zone was submitted to steam stripping and distillation at normal atmospheric pressure to distill off and eliminate the hydrogen sulfide and other gases as well as decomposed light oils to obtain the final product.

The properties of the pretreated oils at the time of the 50th hour of the reaction are shown in Table X. By way of comparison, the instance where the pretreatment was carried out using only bauxite is shown as Comparison 7. The refractory particles used in Examples 4–6 were respectively laterite, bauxite and magnetite prepared by the hereinbefore described method.

TABLE X

| Experiment | Total sulphur, wt. percent | Total nitrogen, wt. percent | Asphaltenes,[1] wt. percent | Metals, p.p.m. Vandium | Nickel |
|---|---|---|---|---|---|
| Feed stock oil | 4.30 | 0.38 | 7.86 | 81 | 28 |
| Example 4 (pretreated oil) | 3.17 | 0.32 | 1.55 | 10 | 6 |
| Example 5 (pretreated oil) | 3.21 | 0.31 | 1.60 | 12 | 7 |
| Example 6 (pretreated oil) | 3.10 | 0.31 | 1.65 | 12 | 8 |
| Comparison 7 (pretreated oil) | 3.21 | 0.33 | 5.34 | 54 | 21 |

[1] Petroleum ether insoluble portion.

As is apparent from Table X, a great decrease in the asphaltenes, vanadium and nickel in the feed stock took place when the pretreatment was carried out using the particulate solid prepared according to the present invention.

Next, the changes in the total sulfur and total nitrogen up to 200 hours after the start of the reaction are shown in Table XI. By way of comparison, the instance where the hydrorefining was carried out using the same feed stock oil and the same catalyst as used in the foregoing reaction zone under identical reaction conditions but without the pretreatment is shown as Comparison 8. Further, the hydrorefining results obtained when the pretreatment was carried out using only bauxite are shown as Comparison 7.

TABLE XI

| | Total sulfur, wt. percent | | | | | Total nitrogen, weight percent | | | | |
|---|---|---|---|---|---|---|---|---|---|---|
| Experiment | After 5 hours | After 50 hours | After 100 hours | After 150 hours | After 200 hours | After 5 hours | After 50 hours | After 100 hours | After 150 hours | After 200 hours |
| Example 4 | 1.23 | 1.31 | 1.35 | 1.35 | 1.37 | 0.21 | 0.24 | 0.25 | 0.25 | 0.27 |
| Example 5 | 1.24 | 1.32 | 1.36 | 1.35 | 1.36 | 0.21 | 0.22 | 0.24 | 0.24 | 0.25 |
| Example 6 | 1.21 | 1.30 | 1.32 | 1.35 | 1.36 | 0.20 | 0.23 | 0.23 | 0.24 | 0.26 |
| Comparison 7 | 1.30 | 1.42 | 1.65 | 1.83 | 2.09 | 0.22 | 0.25 | 0.26 | 0.29 | 0.31 |
| Comparison 8 | 1.31 | 1.68 | 1.87 | 2.05 | 2.33 | 0.26 | 0.28 | 0.30 | 0.31 | 0.33 |

As can be seen from Table XI, when the pretreatment has been carried out according to the present invention, the decrease in the total sulfur and total nitrogen is greater than the case where the pretreatment has not been performed or where the pretreatment has been carried out using bauxite only. Further, the decline in the catalytic activity of the reaction zone was conspicuously less when the pretreatment was carried out, even though the reaction pressure was relatively low.

We claim:

1. In a process for treating a petroleum hydrocarbon feed stock containing asphaltenes comprising a first step wherein said asphaltene-containing petroleum hydrocarbon feed stock is submitted to a preliminary treatment for eliminating the asphaltic and metallic components therefrom and a second step wherein the pretreated feed is subjected to catalytic hydrotreatment, the improved hydrotreating method which comprises carrying out said preliminary treatment by contacting said asphaltene-containing hydrocarbon feed stock with a particulate solid having a plurality of pores, the size of said pores ranging between 1,000 and 50,000 A., said particulate solid containing at least one member selected from the group consisting of Fe, Co, Ni, W, Cr, Mo and V, said particulate solid being obtained by mixing refractory particles of particle size 20–500 microns with 1–15% by weight (dry basis), based on said particles, of alumina hydrogel, followed by molding the mixture and drying.

2. The process according to claim 1 wherein the size of said refractory particles is 20–200 microns.

3. The process according to claim 1 wherein the amount used of said alumina hydrogel is 2–10% by weight (dry basis) of said particles.

4. The process according to claim 1 wherein said particulate solid which has been molded and dried is further calcined.

5. The process according to claim 1 wherein said plurality of pores is present in a pore volume of 0.05–0.9 cubic centimeter per gram of said particulate solid.

6. The process according to claim 1 wherein said refractory particules are particles selected from the group consisting of alumina and the hydrates thereof.

7. The process according to claim 6 wherein the alumina component of said particles has been submitted to a drying treatment.

8. The process according to claim 7 wherein the alumina component of said particles has also been submitted to a calcination treatment.

9. The process according to claim 1 wherein said refractory particles are particles selected from the group consisting of bauxite, laterite, magnetite, diatomaceous earth, clays, ochre and bentonite.

10. The process according to claim 9 wherein said particles are submitted to a drying or calcination treatment.

11. The process according to claim 1 wherein said alumina hydrogel is prepared from an aqueous colloidal solution of basic aluminum sulfate.

12. The process according to claim 1 wherein said alumina hydrogel is prepared from a mixed solution of an aqueous colloidal solution of basic aluminum sulfate and a silica sol.

13. The process according to claim 1 wherein said molding is carried out by the extrusion molding technique.

14. The process according to claim 1 wherein said preliminary treatment is carried out under the conditions of temperature 200–500° C. and pressure below 300 kilogram per square centimeter gauge.

15. The process according to claim 1 wherein said asphaltene-containing petroleum hydrocarbon feed stock is fed to said preliminary treatment zone at a liquid hourly space velocity of 0.2–10 vol./vol./hr.

References Cited

UNITED STATES PATENTS

| | | | |
|---|---|---|---|
| 2,606,141 | 8/1952 | Meyer | 208—211 |
| 3,340,180 | 9/1967 | Beuther | 208—251 |
| 3,362,901 | 1/1968 | Szepe et al. | 208—309 |

HERBERT LEVINE, Primary Examiner

U.S. Cl. X.R.

208—210, 213, 216, 217, 251, 254